(12) United States Patent
Harrall

(10) Patent No.: US 7,077,197 B2
(45) Date of Patent: Jul. 18, 2006

(54) EXPANDABLE TUBULAR CONNECTION

(75) Inventor: Simon J. Harrall, Inverurie (GB)

(73) Assignee: Weatherford/Lamb, Inc., Houston, TX (US)

( * ) Notice: Subject to any disclaimer, the term of this patent is extended or adjusted under 35 U.S.C. 154(b) by 232 days.

(21) Appl. No.: 10/741,418

(22) Filed: Dec. 19, 2003

(65) Prior Publication Data

US 2005/0133223 A1 Jun. 23, 2005

(51) Int. Cl.
*E21B 19/16* (2006.01)
*F16L 35/00* (2006.01)

(52) U.S. Cl. ............... 166/242.1; 166/242.6; 285/331

(58) Field of Classification Search ............ 166/242.1, 166/242.6, 331
See application file for complete search history.

(56) References Cited

U.S. PATENT DOCUMENTS

| | | | | |
|---|---|---|---|---|
| 3,989,284 | A | * | 11/1976 | Blose ....................... 285/332.2 |
| 5,348,095 | A | | 9/1994 | Worrall et al. |
| 6,457,532 | B1 | | 10/2002 | Simpson |
| 6,543,816 | B1 | | 4/2003 | Noel |
| 6,619,696 | B1 | * | 9/2003 | Baugh et al. .................. 285/92 |
| 2002/0163192 | A1 | | 11/2002 | Coulon et al. |
| 2003/0107213 | A1 | | 6/2003 | Baugh et al. |
| 2003/0222409 | A1 | | 12/2003 | Sivley, IV et al. |

OTHER PUBLICATIONS

U.K. Search Report, Application No. GB0427831.3, dated Mar. 3, 2005.

* cited by examiner

*Primary Examiner*—Frank S. Tsay
(74) *Attorney, Agent, or Firm*—Patterson & Sheridan, L.LP.

(57) ABSTRACT

A method and apparatus for a wellbore expandable connection is disclosed. The connection may include a pin having an outward tapered threaded section and a box having an inward tapered threaded section. The threaded sections form a connection of a predetermined integrity upon make-up. An embodiment of the connection includes at least one interface area of the connection that lacks intimate contact between the pin and the box upon initial make-up. Either the box or the pin, or both, have a friction surface at the interface area. Radial expansion of the connection places the pin in contact with the box at the interface area such that the friction surface between them locks the connection. In one embodiment, the connection includes a receptacle profiled in a portion of the box that provides space within the connection for material that extrudes from the pin during expansion of the connection.

20 Claims, 3 Drawing Sheets

EXPANDABLE TUBULAR CONNECTION

FIELD OF THE INVENTION

Embodiments of the present invention generally relate to wellbore completion, and more particularly, to tubular connections.

DESCRIPTION OF THE RELATED ART

In order to access hydrocarbons in subsurface formations, it is typically necessary to drill a bore into the earth. The process of drilling a borehole and of subsequently completing the borehole in order to form a wellbore requires the use of various tubular strings. These tubulars are typically run downhole where the mechanical and seal integrity of the jointed connections are critically important in the original make-up of the tubulars, during expansion of the tubulars, and after expansion of the tubulars.

Typically, simple male to female threaded connections connect multiple tubular members end-to-end. The male end is generally referred to as a pin, and the female end as a box. The tubulars are connected, or "made-up," by transmitting torque against one of the tubulars while the other tubular is typically held stationary. Transmitting torque in a single direction corresponding with connection make-up tightens the threaded joint in order to establish the seal integrity and lock in the applied torque.

When running tubulars, there is sometimes a requirement to run jointed tubulars that will later be expanded by various types of expansion mechanisms. The most basic type of expander tool employs a simple cone-shaped body, which is typically run into a wellbore at the bottom of the casing that is to be expanded. The expander tool is then forced upward in the wellbore by both pulling on the working string from the surface and applying pressure below the cone. A basic arrangement of a conical expander tool is disclosed in U.S. Pat. No. 5,348,095, issued to Worrall, et al., and that patent is incorporated herein in its entirety. Pulling the expanded conical tool has the effect of expanding a portion of a tubular into sealed engagement with a surrounding formation wall, thereby sealing off the annular region therebetween. More recently, rotary expander tools have been developed. Rotary expander tools employ one or more rows of compliant rollers that are urged outwardly from a body of the expander tool in order to engage and to expand the surrounding tubular. The expander tool is rotated downhole so that the actuated rollers can act against the inner surface of the tubular to be expanded in order to expand the tubular body circumferentially. Radial expander tools are described in U.S. Pat. No. 6,457,532, issued to Simpson et al., and that patent is incorporated herein by reference in its entirety.

Expanding tubulars that use the same threaded connections as employed with conventional oil-field tubulars proves to be problematic due to the changes in geometry of the connection during expansion. During expansion, the pin elongates thereby de-energizing the seal, reducing the locked in torque, and reducing the tensile capacity of the connection due to loss of intimate contact between the threads when the locked in torque is reduced. Continuing expansion of the tubular through further rotation and frictional contact of the rotary expansion tool after expanding the connection either retightens the connection or unscrews it completely since expansion of the connection reduced its locked in torque.

Additionally, fatiguing of the pin during expansion causes material from the pin to extrude into an interior region of the tubular and form scallops. This material on the inside surface of the tubular inhibits passage of tools and equipment through the tubular. Extrusion of material from the pin also destroys the box-pin seal that was established during make up.

Therefore, a need exists for an improved tubular connection that is capable of being expanded without losing its mechanical or sealing integrity.

SUMMARY OF THE INVENTION

The present invention generally relates to a wellbore expandable connection. The connection may include a pin having an outward tapered threaded section and a box having an inward tapered threaded section. The threaded sections form a connection of a predetermined integrity upon make-up. An embodiment of the connection includes at least one interface area of the connection that lacks intimate contact between the pin and the box upon initial make-up. Either the box or the pin, or both, have a friction surface at the interface area. Radial expansion of the connection places the pin in contact with the box at the interface area such that the friction surface between them locks the connection. In one embodiment, the connection includes a receptacle profiled in a portion of the box that provides space within the connection for material that extrudes from the pin during expansion of the connection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
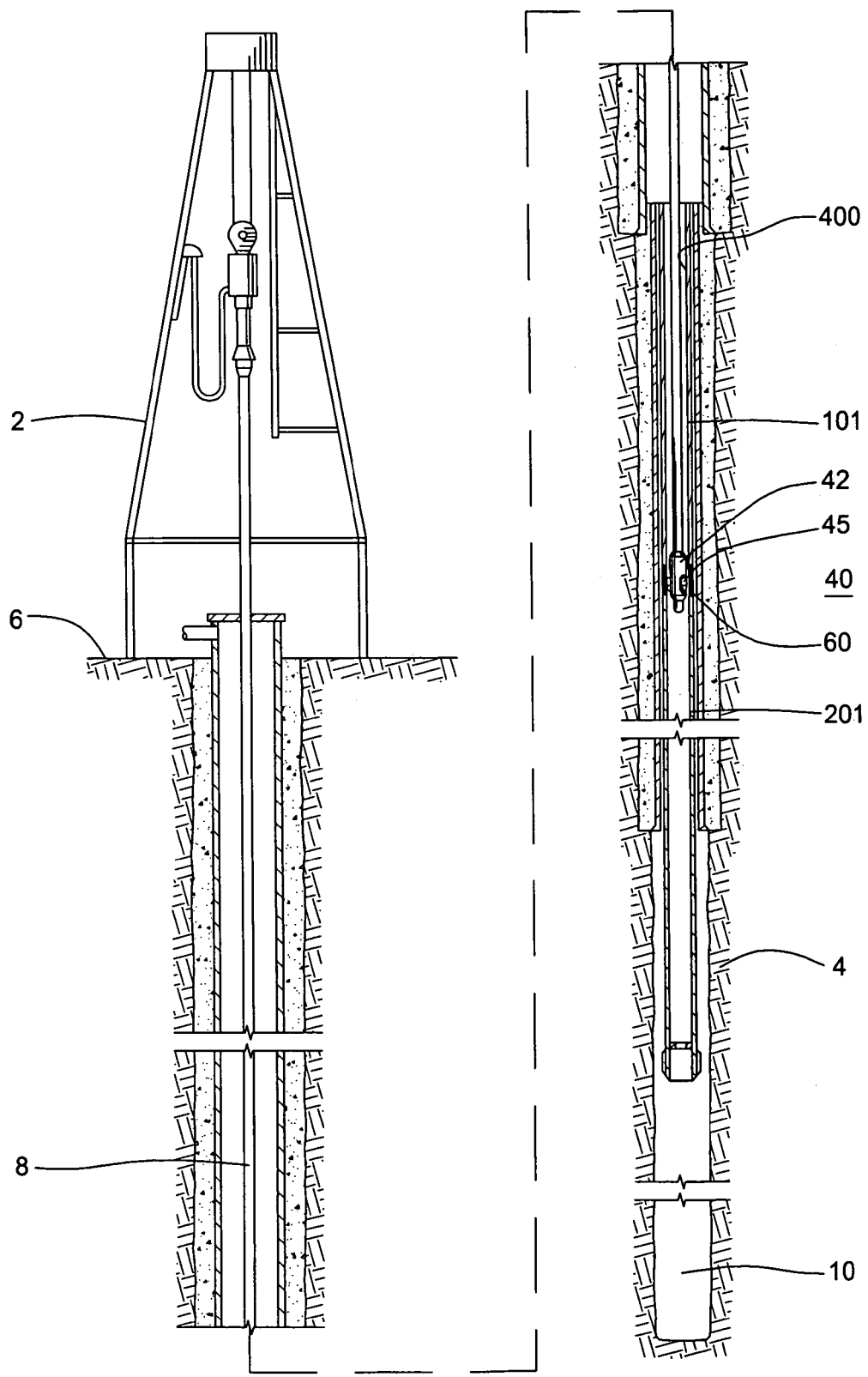
FIG. 1 is an elevation view schematically showing tubulars within a borehole and a representative expander tool at a connection between two tubulars.

FIG. 1 illustrates an embodiment of the present invention in use within a wellbore 10. Visible in FIG. 1 is a representative rig 2, a ground surface 6, a formation 4, a drill string or running string 8, a first tubular 101, a second tubular 201, a representative expander tool 40 comprising a body 42 and an expansion member 45 or roller, a bore 400 running through the tubulars, and a connection 60 or joint, between the first tubular 101 and the second tubular 201.

In operation, the first tubular 101 and the second tubular 201 are mated together at the surface 6 according to normal stab-in and threading procedures. The stab-in procedures can be preformed with tubulars arranged in a pin up and a box down configuration or a configuration with the pin down and the box up. After run-in, the tubulars can be expanded from within by any method known to those skilled in the art. The expansion process can be run in any axial and/or rotational direction within the tubulars 101, 201. As shown, a running tool with an expander tool 40 attached thereto is run up the bore 400 of the tubulars. At a desired location, an operator expands the tubulars. When the expander tool 40 reaches the connection 60 between the first tubular 101 and the second tubular 201, an internal wall of the pin portion of the first tubular 101 expands into an internal wall of the box portion of the second tubular 201. The connection 60 between the tubulars 101, 201 is capable of being expanded without losing its mechanical or sealing integrity.

Figure 2:
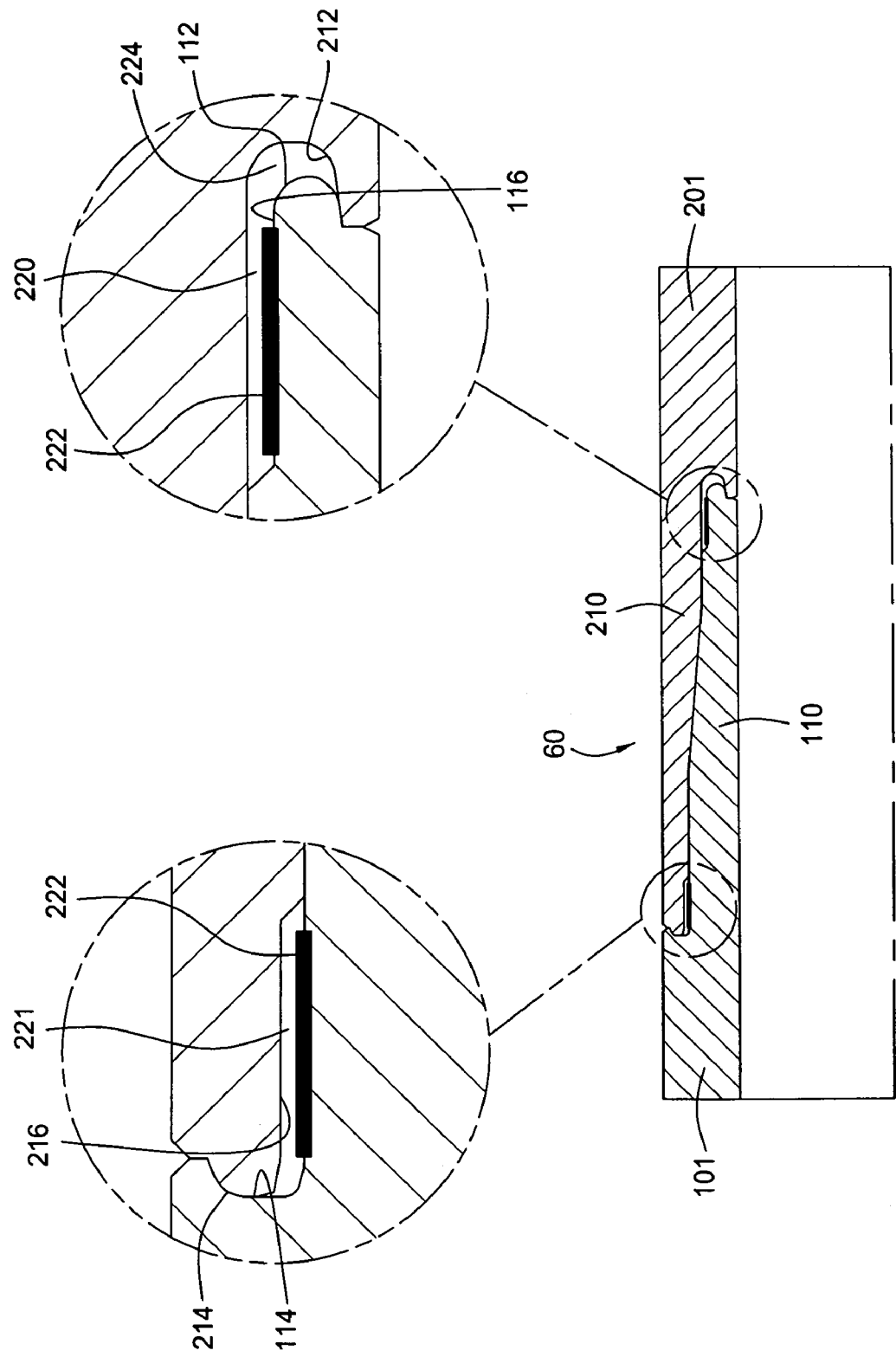
FIG. 2 illustrates the threaded connection in greater detail in accordance with one embodiment of the invention.

FIG. 2 illustrates the threaded connection 60 in greater detail in accordance with one embodiment of the invention. The connection 60 includes a pin member 110 formed at a threaded section of the first tubular 101 and a box member 210 formed at a threaded section of the second tubular 201. As shown, an end 214 of the box member 210 contacts a shoulder 114 of the pin member 110 when mated. In one embodiment, the threaded sections of the pin member 110 and the box member 210 are tapered. The threaded sections of the pin member 110 and the box member 210 form the connection 60 of a predetermined integrity when the pin member 110 is mated with the box member 210. Additionally, depending upon wellbore characteristics, the threads may be coated with Teflon, an inert sealant, or other material known to those in the art for sealing purposes. The threads may be dovetail threads, as described in U.S. Pat. No. 3,989,284, issued to Blose, and that patent is incorporated herein by reference. The threads may be machined on plain end tubulars, tubulars with both ends upset, tubulars with one plain end and one end upset, or other connection types as typically used in the oil and gas industry. One of ordinary skill in the art can appreciate that embodiments of the present invention are not limited to only certain kinds of tubular ends or thread types.

Figure 3:
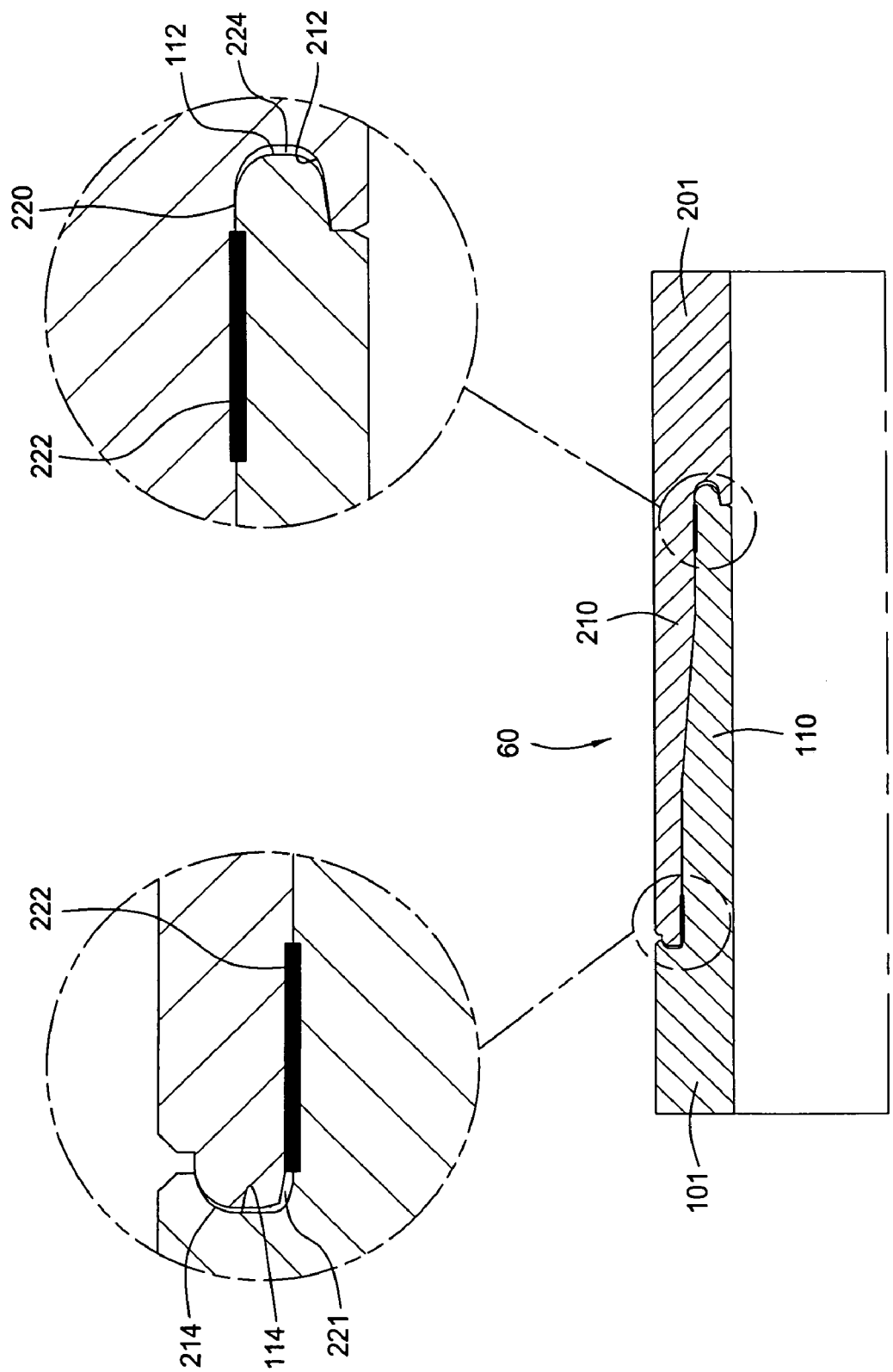
FIG. 3 illustrates the threaded connection after expansion of the tubulars at the connection.

In one embodiment, the pin member 110 includes a flank portion 116 having a decreased diameter along an outside surface of a length of the pin member 110 adjacent its end 112. The flank portion 116 provides a first interface area 220 of the connection 60 wherein the pin member 110 and the box member 220 lack contact during make up due to an annular gap between the pin member 110 and the box member 210. Additionally, the box member 210 includes a profile portion 216 having an increased diameter along an inside surface of a length of the box member 210 adjacent its end 214. Similar to the flank portion 116, the profile portion 216 provides a second interface area 221 of the connection 60 wherein the pin member 110 and the box member 210 lack contact during make up. A friction surface 222 at least partially lines the pin member 110 and/or box member 210 at the interface areas 220, 221. As shown the friction surface 222 is applied to the surface of the pin member 110; however, the friction surface 222 can alternatively be applied to the box member 210 or both the box member 210 and pin member 110. One example of the friction surface 222 consists of a coating of fine particles of tungsten carbide grit that embed into the corresponding pin member 110 or box member 210 upon expansion as shown in FIG. 3. However, the friction surface 222 can be any other material or surface alteration that increases the frictional relationship between the pin member 110 and the box member 210 such as machined formations or scallops. Since the interface areas 220, 221 lack contact between the pin member 110 and box member 210, the connection 60 can be unmade conventionally prior to any expansion without detriment to either the pin member 110 or the box member 210. The connection 60 can utilize one or multiple interface areas 220, 221 that can be provided by any combination of flank portions 116 or profiled portions 216 in conjunction with the friction surface 222.

Also shown in FIG. 2 is a receptacle 224 formed by a recess 212 within a wall of the box member 210. At the time of make up of the connection 60, the end 112 of the pin member 110 does not completely contact or fill the receptacle 224. A seal (not shown) such as an elastomer ring positioned within the receptacle 224 can provide additional sealing between the end 112 of the pin member 110 and the groove 212 of the box member 210.

FIG. 3 shows the connection 60 after being expanded in the wellbore 10. The friction surface 222 contacts both the outside surface of the pin member 110 and the inside surface of the box member 210 in order to frictionally secure the pin and box members 110, 210 together during and after expansion. The position of the one or more interface areas 220, 221 within the connection 60 determines where along the connection 60 that the friction surface provides a physical lock from the frictional interactions. The groove 212 of the box member 210 accommodates elongation of the end 112 of the pin member 110 due to expansion of the connection 60 by providing the receptacle 224. As shown in FIG. 3, the extruded material from the pin member 110 has substantially filled the receptacle 224 without forming scallops on an inside surface of the tubulars 101, 201. In this manner, the connection 60 is capable of being radially expanded without substantially altering its internal finish or losing its mechanical or sealing integrity.

Although embodiments of the invention are described with reference to a box member, other types of tubular resembling a box member, such as a coupling, are also contemplated by the embodiments of the invention.

While the foregoing is directed to embodiments of the present invention, other and further embodiments of the invention may be devised without departing from the basic scope thereof, and the scope thereof is determined by the claims that follow.

The invention claimed is:

1. A wellbore tubular connection, comprising:
    a tubular pin member having an annular recess with a decreased outside diameter at the end of the pin member;
    a tubular box member; and
    a friction surface disposed on at least one of the tubular members at least partially along an annular gap between the annular recess of the pin member and the box member.

2. The wellbore tubular connection of claim 1, wherein the friction surface is a coating comprising tungsten carbide grit disposed on at least one of the members.

3. The wellbore tubular connection of claim 1, wherein the friction surface comprises tungsten carbide grit disposed on at least a portion of the annular recess.

4. The wellbore tubular connection of claim 1, wherein the friction surface comprises formations on both the pin member and the box member.

5. The wellbore tubular connection of claim 1, wherein the friction surface comprises machined formations on at least one of the members.

6. The wellbore tubular connection of claim 1, further comprising a receptacle within the box member adapted to collect extruded material from the pin member during an expansion of the connection.

7. A wellbore tubular connection, comprising:
    a tubular pin member;
    a tubular box member; and
    a receptacle within the box member adapted to collect extruded material from the pin member during an expansion of the connection.

8. A method for utilizing an expandable connection in a wellbore, comprising:
   connecting a pin of a first tubular to a box of a second tubular to provide a connection, wherein an interface area located at at least one end of the connection relative to a threaded section of the connection provides an annular gap between the pin and the box;
   running the tubulars into the wellbore; and
   expanding the connection radially, wherein the expanding locks the connection by pressing the pin into contact with the box along a friction surface disposed at least partially within the interface area, and wherein the friction surface comprises formations on at least one of the pin and the box.

9. The method of claim 8, wherein a recess in the outside diameter of the end of the pin provides the interface area.

10. The method of claim 8, wherein a profile in the inside diameter of the end of the box provides the interface area.

11. The method of claim 8, wherein the friction surface comprises tungsten carbide grit.

12. The method of claim 8, wherein the friction surface comprises formations on the box.

13. The method of claim 8, wherein the friction surface comprises formations on the pin.

14. A wellbore tubular connection, comprising:
   a tubular pin member;
   a tubular box member having a profile with an increased inside diameter at the end of the box member; and
   a friction surface disposed at least partially within an interface area of the tubular connection, wherein the interface area defines an annular gap between the profile of the box member and the pin member during make-up.

15. The wellbore tubular connection of claim 14, wherein the interface area further includes an annular gap between the box member and the pin member adjacent an annular recess at the end of the pin member.

16. The wellbore tubular connection of claim 14, wherein the friction surface is a coating comprising tungsten carbide grit disposed on at least one of the members.

17. The wellbore tubular connection of claim 14, wherein the friction surface comprises formations on both the pin member and the box member.

18. The wellbore tubular connection of claim 14, wherein the friction surface comprises machined formations on at least one of the members.

19. The wellbore tubular connection of claim 14, further comprising a receptacle within the box member adapted to collect extruded material from the pin member during an expansion of the connection.

20. A wellbore tubular connection, comprising:
   a tubular pin member having a thread on an outside surface thereof;
   a tubular box member having a mating thread on an inside surface thereof; and
   a friction surface, wherein the friction surface is at an end portion of at least one of the members relative to the threads and disposed at least partially within an annular gap between the pin member and box member during make up.

* * * * *